(12) United States Patent
Koizumi et al.

(10) Patent No.: US 9,768,713 B2
(45) Date of Patent: Sep. 19, 2017

(54) ELECTRIC TOOL (71) Applicant: HITACHI KOKI CO., LTD., Tokyo (JP)

(72) Inventors: Toshiaki Koizumi, Ibaraki (JP); Naoki Tadokoro, Ibaraki (JP); Kazutaka Iwata, Ibaraki (JP); Eiji Nakayama, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 0 days.

(21) Appl. No.: 14/893,124

(22) PCT Filed: Aug. 26, 2014

(86) PCT No.: PCT/JP2014/072855
§ 371 (c)(1),
(2) Date: Nov. 23, 2015

(87) PCT Pub. No.: WO2015/045740
PCT Pub. Date: Apr. 2, 2015

(65) Prior Publication Data
US 2016/0204718 A1    Jul. 14, 2016

(30) Foreign Application Priority Data

Sep. 28, 2013   (JP) ................. 2013-202837

(51) Int. Cl.
*H02P 1/00*       (2006.01)
*H02P 1/22*       (2006.01)
(Continued)

(52) U.S. Cl.
CPC .................. *H02P 1/22* (2013.01); *B25F 5/00* (2013.01); *H01H 9/06* (2013.01); *H02P 3/06* (2013.01); *H01H 9/063* (2013.01); *H01H 23/30* (2013.01)

(58) Field of Classification Search
CPC .... B25F 5/00; B25F 5/02; B25F 5/001; B25F 5/008; B25F 5/021; B25B 21/02;
(Continued)

(56) References Cited

U.S. PATENT DOCUMENTS 4,169,972 A * 10/1979 Black, III ............ H01H 23/164
                                                    200/315
4,321,814 A *  3/1982 Martin .................. B21J 15/043
                                                    72/114
(Continued)

FOREIGN PATENT DOCUMENTS

EP    2 524 773 A2   11/2012
EP    2 589 465 A2    5/2013
(Continued)

OTHER PUBLICATIONS

International Search Report and Written Opinion of the International Search Report for PCT/JP2014/072855 dated Jan. 8, 2015.
(Continued)

*Primary Examiner* — Paul Ip
(74) *Attorney, Agent, or Firm* — Kenealy Vaidya LLP (57) ABSTRACT

An electric tool includes a brushless motor and an output part, which is driven by the brushless motor and to which a tip tool is mounted, and a tumbler switch. The tumbler switch applies, to the control unit, a stop signal for stopping the brushless motor at a neutral position, a forward rotation signal for forward rotating the brushless motor by an operation in a first direction, and a reverse rotation signal for reversely rotating the brushless motor by an operation in a second direction.

4 Claims, 9 Drawing Sheets

US 9,768,713 B2

Page 2

(51) Int. Cl.
*H02P 3/06* (2006.01)
*H01H 9/06* (2006.01)
*B25F 5/00* (2006.01)
*H01H 23/30* (2006.01)

(58) Field of Classification Search
CPC . B25B 21/00; B25B 23/1405; B25B 23/1475; B25B 23/14; B25B 23/0064; B25B 23/147; B25B 21/008; B25B 21/026; B25B 23/00
USPC .............. 318/252, 400.08, 400.18, 257, 430; 173/1, 11, 176, 217, 109, 170; 200/315, 200/1 V
See application file for complete search history.

(56) References Cited

U.S. PATENT DOCUMENTS

| | | | |
|---|---|---|---|
| 4,412,158 A * | 10/1983 | Jefferson | H02P 25/145 318/257 |
| 4,459,522 A * | 7/1984 | Huber | H01H 9/063 200/1 V |
| 5,136,220 A * | 8/1992 | Philipp | H02P 6/24 318/362 |
| 5,235,261 A * | 8/1993 | Philipp | A61B 17/1626 318/504 |
| 5,268,622 A * | 12/1993 | Philipp | A61B 17/1626 318/400.08 |
| 5,563,482 A * | 10/1996 | Shaw | B25B 23/147 173/176 |
| 5,572,916 A * | 11/1996 | Takano | B23D 47/12 83/471.3 |
| 5,831,402 A * | 11/1998 | Yang | B25B 23/14 173/176 |
| 6,607,041 B2 * | 8/2003 | Suzuki | B25B 21/02 173/11 |
| 6,733,414 B2 * | 5/2004 | Elger | B25F 5/001 173/109 |
| 7,036,605 B2 * | 5/2006 | Suzuki | B25B 21/02 173/176 |
| 7,077,218 B2 * | 7/2006 | Justis | B25F 5/02 173/170 |
| 7,134,510 B2 * | 11/2006 | Justis | B25F 5/02 173/170 |
| 7,174,973 B1 * | 2/2007 | Lysaght | H02P 7/29 173/217 |
| 7,318,485 B2 * | 1/2008 | Greese | B25B 21/00 173/1 |
| 7,600,885 B2 * | 10/2009 | Canino | B25B 21/00 362/119 |
| 7,896,098 B2 * | 3/2011 | Suzuki | B25B 21/02 173/11 |
| 8,022,654 B2 * | 9/2011 | Zhao | H02P 1/04 318/252 |
| 8,210,275 B2 * | 7/2012 | Suzuki | B25B 21/02 173/11 |
| 8,286,723 B2 * | 10/2012 | Puzio | B25B 23/0064 173/1 |
| 8,403,072 B2 * | 3/2013 | Eshleman | B25B 21/00 173/1 |
| 8,418,778 B2 * | 4/2013 | Eshleman | B25B 21/00 173/1 |
| 8,627,900 B2 * | 1/2014 | Oomori | B25F 5/008 173/168 |
| 8,698,430 B2 * | 4/2014 | Watanabe | B25F 5/001 173/11 |
| 8,786,233 B2 * | 7/2014 | Fair | B25B 13/461 318/400.38 |
| 8,800,680 B2 * | 8/2014 | Eshleman | B25B 21/00 173/1 |
| 2002/0050364 A1 * | 5/2002 | Suzuki | B25B 21/02 173/1 |
| 2002/0094907 A1 * | 7/2002 | Elger | B25F 5/001 475/331 |
| 2003/0047331 A1 * | 3/2003 | Henderson | B23P 19/066 173/4 |
| 2003/0070511 A1 * | 4/2003 | Nottingham | B25B 21/00 81/54 |
| 2004/0144552 A1 * | 7/2004 | Suzuki | B25B 21/02 173/2 |
| 2005/0257945 A1 * | 11/2005 | Justis | B25F 5/02 173/217 |
| 2006/0087286 A1 | 4/2006 | Phillips et al. | |
| 2006/0118315 A1 * | 6/2006 | Suzuki | B25B 21/02 173/2 |
| 2006/0157260 A1 * | 7/2006 | Greese | B25B 21/00 173/1 |
| 2006/0208026 A1 * | 9/2006 | Justis | B25F 5/02 227/117 |
| 2008/0043459 A1 * | 2/2008 | Canino | B25B 21/00 362/119 |
| 2009/0080987 A1 * | 3/2009 | Canino | B25B 21/00 408/16 |
| 2009/0104861 A1 * | 4/2009 | Van Der Linde | B25F 5/02 451/344 |
| 2009/0206783 A1 * | 8/2009 | Zhao | H02P 1/04 318/430 |
| 2011/0114346 A1 * | 5/2011 | Suzuki | B25B 21/02 173/2 |
| 2011/0139851 A1 * | 6/2011 | McCuen | A61B 17/07207 227/175.1 |
| 2011/0180286 A1 * | 7/2011 | Oomori | B25F 5/008 173/20 |
| 2011/0203821 A1 * | 8/2011 | Puzio | B25B 23/0064 173/1 |
| 2011/0227430 A1 * | 9/2011 | Omori | B25F 5/00 310/50 |
| 2011/0284255 A1 * | 11/2011 | Ookubo | B23B 45/02 173/109 |
| 2011/0284256 A1 * | 11/2011 | Iwata | B25F 5/00 173/176 |
| 2012/0068633 A1 * | 3/2012 | Watanabe | B25F 5/001 318/3 |
| 2012/0074878 A1 * | 3/2012 | Pant | B25B 23/147 318/139 |
| 2012/0074881 A1 * | 3/2012 | Pant | B25B 23/147 318/400.09 |
| 2012/0160529 A1 * | 6/2012 | Eshleman | B25B 21/00 173/1 |
| 2012/0274253 A1 * | 11/2012 | Fair | B25B 13/461 318/434 |
| 2012/0279736 A1 * | 11/2012 | Tanimoto | B25B 21/02 173/2 |
| 2012/0292070 A1 * | 11/2012 | Ito | H02K 5/225 173/217 |
| 2013/0014967 A1 * | 1/2013 | Ito | B25F 5/00 173/93 |
| 2013/0087355 A1 * | 4/2013 | Oomori | B25B 21/00 173/47 |
| 2013/0105187 A1 * | 5/2013 | Agehara | B25B 21/02 173/20 |
| 2013/0119915 A1 | 5/2013 | Pusateri et al. | |
| 2013/0126202 A1 * | 5/2013 | Oomori | B25B 21/02 173/217 |
| 2013/0133911 A1 * | 5/2013 | Ishikawa | B25B 21/00 173/176 |
| 2013/0140050 A1 * | 6/2013 | Eshleman | B25B 21/00 173/1 |
| 2013/0186659 A1 * | 7/2013 | Eshleman | B25B 21/00 173/1 |
| 2013/0186660 A1 * | 7/2013 | Eshleman | B25B 21/00 173/1 |
| 2013/0193891 A1 * | 8/2013 | Wood | H02P 7/06 318/434 |
| 2013/0207491 A1 * | 8/2013 | Hatfield | H02K 11/33 310/50 |
| 2013/0270932 A1 * | 10/2013 | Hatfield | H02K 3/28 310/50 |

(56) References Cited

U.S. PATENT DOCUMENTS

| | | | | |
|---|---|---|---|---|
| 2014/0014384 A1* | 1/2014 | Horie | ............... | H01M 2/105 173/217 |
| 2014/0139055 A1* | 5/2014 | Oomori | ............... | B25F 5/008 310/50 |
| 2014/0327382 A1* | 11/2014 | Fair | ............... | B25B 13/461 318/436 |
| 2015/0288259 A1* | 10/2015 | Koizumi | ............... | B25F 5/02 173/170 |

FOREIGN PATENT DOCUMENTS

| | | |
|---|---|---|
| EP | 2 826 604 A1 | 1/2015 |
| JP | 58-122333 U | 8/1983 |
| JP | 2-106829 A | 4/1990 |
| JP | 2011-183523 A | 9/2011 |
| JP | 2012-139784 A | 7/2012 |
| JP | 2013-146812 A | 8/2013 |
| JP | 2013-188825 A | 9/2013 |

OTHER PUBLICATIONS

Japanese Office Action for the related Japanese Patent Application No. 2013-202837 dated Sep. 26, 2016.

\* cited by examiner

TUMBLER SWITCH OPERATION (1)

(1) A CASE WHERE REVERSE ROTATION IS MADE (2) A CASE WHERE REVERSE ROTATION IS NOT MADE (SAME DIRECTION)

TUMBLER SWITCH OPERATION (2)

(1) A CASE WHERE REVERSE ROTATION IS MADE (2) A CASE WHERE REVERSE ROTATION IS NOT MADE (SAME DIRECTION)

ELECTRIC TOOL

This application is a U.S. national phase filing under 35 U.S.C. §371 of PCT Application No. PCT/JP2014/072855, filed Aug. 26, 2014, and which in turn claims priority under 35 U.S.C. §119 to Japanese Patent Application No. JP2013-202837, filed Sep. 28, 2013, the entireties of which are incorporated by reference herein.

TECHNICAL FIELD

The present invention relates to an electric tool for switching stop, forward rotation and reverse rotation of a motor by one switch (for example, a tumbler switch).

BACKGROUND ART

In an electric tool such an impact wrench that is driven by a commercial alternating current power supply, a universal motor (a series winding commutator motor) has been adopted as a driving source.

Figure 8:
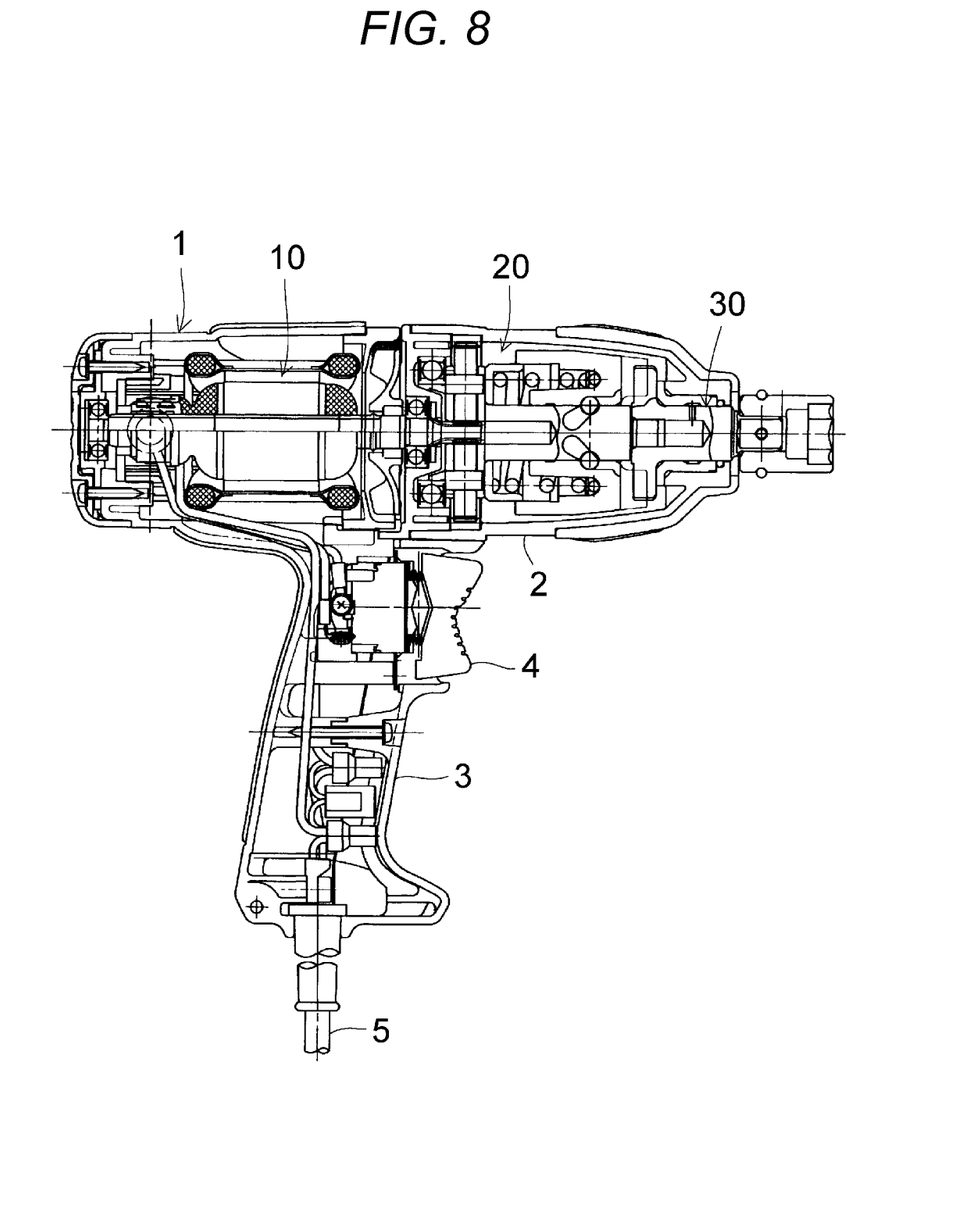
FIG. 8 is a side sectional view illustrating an impact wrench, which is an example of the electric tool of the related art.

FIG. 8 illustrates an impact wrench as an electric tool using a universal motor. The impact wrench has a housing 1, a universal motor 10, a striking mechanism part 20 rotated by the universal motor, and an output part 30 connected to the striking mechanism part 20. The output part 30 is mounted with a variety of tip tools.

The housing 1 has a trunk part 2 accommodating therein the universal motor 10, the striking mechanism part 20 and a part of the output part 30, and a handle part 3 having one end connected to the trunk part 2. The handle part 3 is provided with a tumbler switch 4, and a power supply cord 5 is drawn out from a lower part of the handle part 3.

Figure 9:
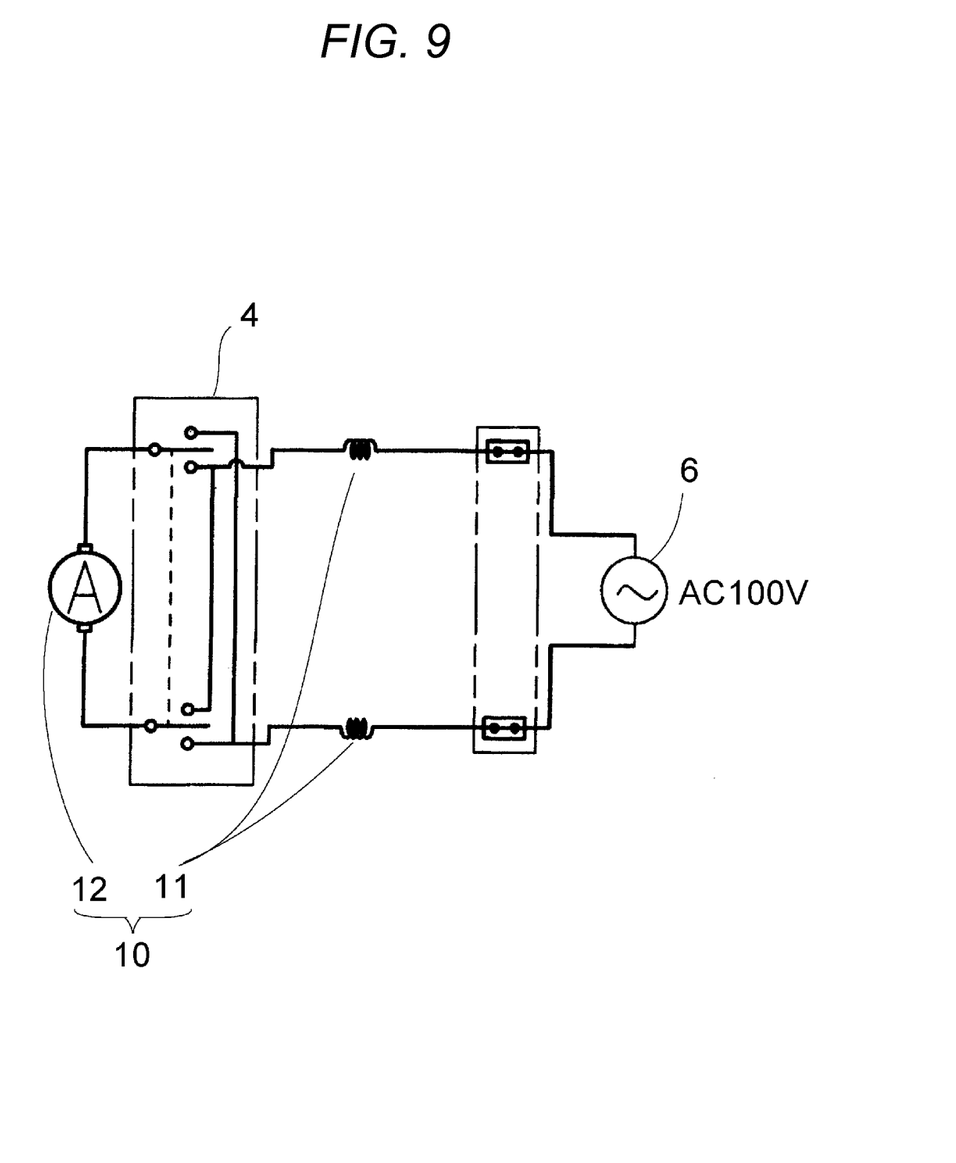
FIG. 9 is a circuit diagram using a tumbler switch of the related art.

FIG. 9 is a circuit diagram showing an operation of switching stop, forward rotation and reverse rotation of the universal motor 10 by the tumbler switch 4. A field winding (a stator winding) 11 and an armature winding 12 of the universal motor 10 are connected in series to a commercial alternating current power supply 6 (for example, AC 100V) through contact points of two circuits of the tumbler switch 4. That is, the field winding 11 and the armature winding 12 are disconnected to stop the universal motor 10 when the tumbler switch 4 is at a neutral position, the field winding 11 and the armature winding 12 are connected in series with each other to forward rotate the universal motor 10 by operating the tumbler switch in a first direction, and a series connection relation between the field winding 11 and the armature winding 12 is switched to reversely rotate the universal motor 10 by operating the tumbler switch in a second direction. PTL 1 discloses an example of an alternating current-type electric tool, and PTL 2 discloses an example of a direct current-type electric tool.

CITATION LIST

Patent Literature

PTL 1: JP-UM-A-58-122333
PTL 2: JP-A-2013-146812

SUMMARY OF INVENTION

Technical Problem

According to the electric tool of the related art shown in FIG. 8, since a universal motor, in which a commutator is required and which efficiency is low, is adopted, an overall length of the product is lengthened and a weight thereof is heavy. Thus, the electric tool is not suitable for longtime operation, which deteriorates the operating efficiency. Also, since the tumbler switch is arranged on a discharge path (a current path), an over-current flows when an overload is made, so that a contact point of the tumbler switch may be melted.

It is therefore an object of the present invention to provide an electric tool not requiring a commutator, adopting a high-efficiency brushless motor as a driving source, and using a switch such as a tumbler switch as a switching means for control of the brushless motor to shorten an overall length of the electric tool, to lighten the electric tool and to hold a favorable operability by the switch.

Solution to Problem

According to one illustrative aspect of the present invention, there is provided an electric tool comprising: a brushless motor; an output part, which is driven by the brushless motor, and to which a tip tool is mounted; a control unit configured to control a rotation direction and a rotating speed of the brushless motor; and a switch configured to start driving of the brushless motor, wherein the switch is configured to: apply, to the control unit, a stop signal for stopping the brushless motor in a case where the switch is at a neutral position; apply, to the control unit, a forward rotation signal for forward rotating the brushless motor in a case where the switch is operated in a first direction; and apply, to the control unit, a reverse rotation signal for reversely rotating the brushless motor in a case where the switch is operated in a second direction.

According to another illustrative aspect of the present invention, there is provided an electric tool comprising: a brushless motor, to which power is fed from a power supply; an output part, which is driven by the brushless motor, and to which a tip tool is mounted; a control unit configured to control a rotation direction and a rotating speed of the brushless motor; and a switch configured to: stop the brushless motor in a case where the switch is at a neutral position; forward rotate the brushless motor in a case where the switch is operated in a first direction; and reversely rotate the brushless motor in a case where the switch is operated in a second direction, wherein the switch is provided outside a current path between the power supply and the brushless motor.

Incidentally, any combination of the above-described components, and a method, a system and the like converted from the expressions of the present invention are also effective as the aspects of the present invention.

Advantageous Effects of Invention

The electric tool of the present invention adopts a high-efficiency brushless motor, which does not require a commutator, as a driving source, and uses a switch such as a tumbler switch as a switching means for control of the brushless motor to shorten an overall length of the electric tool, to lighten the electric tool and to hold a favorable operability by the switch. Therefore, it is possible to perform a longtime operation and to realize the favorable workability and operability.

BRIEF DESCRIPTION OF DRAWINGS

FIGS. 5(1) and 5(2) are timing charts of the tumbler switch operation (1).

FIGS. 7(1) and 7(2) are timing charts of the tumbler switch operation (2).

DESCRIPTION OF EMBODIMENTS

Hereinafter, preferred illustrative embodiments of the present invention will be described with reference to the drawings. Incidentally, the same or equivalent components, members and the like shown in the respective drawings are denoted with the same reference numerals and the overlapping descriptions are appropriately omitted. Also, the illustrative embodiments are just exemplary, not to limit the present invention, and all features and combinations thereof described in the illustrative embodiments cannot be considered as the essentials of the present invention.

Figure 1:
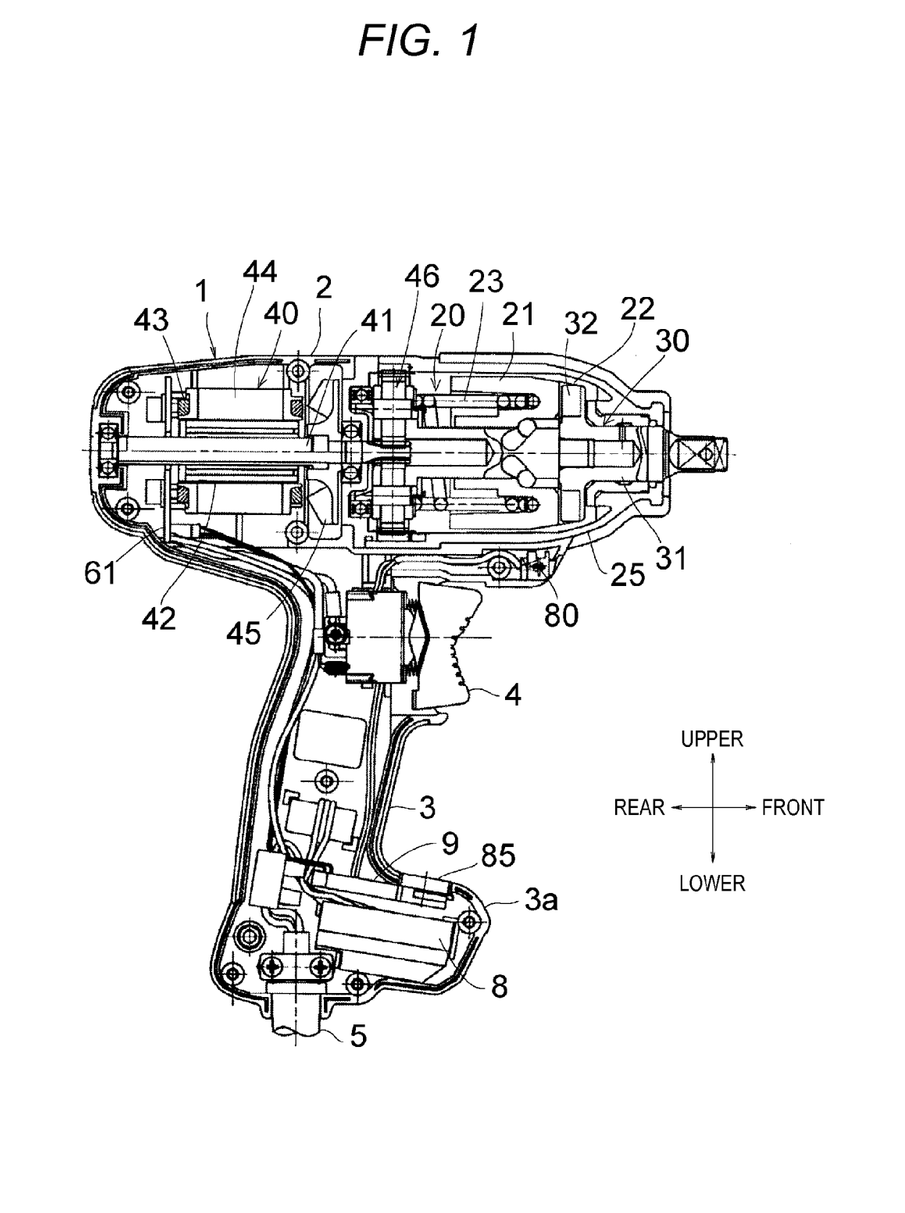
FIG. 1 is a side sectional view illustrating an impact wrench, which is an illustrative embodiment of the electric tool of the present invention.

FIGS. 1 to 7 illustrate an impact wrench according to an illustrative embodiment of the electric tool of the present invention (in FIG. 1, front, rear, upper and lower directions are defined). As shown in FIG. 1, a housing 1 has a trunk part 2 accommodating a brushless motor 40, a striking mechanism part 20 and a part of an output part 30, and a handle part 3 having one end connected to the trunk part 2. Also, a control unit for controlling stop, a rotation direction, a rotating speed and the like of the brushless motor 40 has a control circuit 50 and an inverter circuit 60. In the housing 1, a control circuit board 9 and an inverter circuit board 61 on which the control circuit 50 and the inverter circuit 60 are respectively mounted are accommodated. The control circuit board 9 is arranged at a lower part in the handle part 3, and the inverter circuit board 61 is arranged inside the trunk part 2 at the rear of the brushless motor 40.

The brushless motor 40 has an output shaft 41 extending in a front-rear direction, a rotor 42 fixed to the output shaft 41 and having a plurality of permanent magnets, a stator 44 arranged to surround the rotor 42 and having a plurality of stator windings (stator coils) 43 and a cooling fan 45 fixed to the output shaft 41. Both sides of the output shaft 41 are pivotally supported (supported by bearings), and the stator 44 is fixed to the trunk part 2 of the housing 1. Rotation of the output shaft 41 is decelerated through a planetary gear mechanism 46, which is then applied to a hammer 21 of the striking mechanism part 20.

The striking mechanism part 20 has the hammer 21 arranged in a hammer case 25 and a spring 23 urging forwards the hammer. The hammer 21 has a striking part 22 at a front end thereof and is rotated by an output shaft of the planetary gear mechanism 46. An anvil 31 configuring the output part 30 has a part to be struck 32 at a rear end thereof. Also, the hammer 21 is urged forwards by the spring 23 so that when it is rotated, the striking part 22 strikes the part to be struck 32 in a rotation direction. By this configuration, when the hammer 21 is rotated, it is possible to strike the anvil 31 of the output part 30. Also, the hammer 21 is configured to move rearwards against the urging force of the spring. After the striking part 22 collides with the part to be struck 32, the hammer 21 is retreated with rotating against the urging force of the spring 23. When the striking part 22 gets over the part to be struck 32, the elastic energy accumulated in the spring 23 is released, so that the hammer 21 is moved forwards and the striking part 22 again collides with the part to be struck 32.

The anvil 31 configuring the output part 30 is rotatably supported at a tip of the trunk part 2, i.e., at a front end-side of the hammer case 25. The anvil 31 can be mounted with a variety of tip tools.

The handle part 3 is provided with one electronic switch, specifically a tumbler switch (hereinafter, often referred to as 'tumbler SW') 4 for switching stop, forward rotation and reverse rotation of the brushless motor 40. The tumbler switch 4 is arranged at a position at which an operator can easily operate the same with a finger. Functions of the tumbler switch 4 will be described later with reference to FIGS. 2 and 3 and the like.

A power supply cord 5 is drawn out from a lower part of the handle part 3. A power supply circuit board 8 and a control circuit board 9 are accommodated at a lower part in the handle part 3. The power supply circuit board 8 is connected to the power supply cord 5 and has a rectification circuit 7 mounted thereon for converting alternating current power from a commercial alternating current power supply 6 (for example, AC 100V) of FIG. 2 into direct current power. The control circuit board 9 has thereon a control circuit 50 of the control unit for controlling stop, a rotation direction, a rotating speed and the like of the brushless motor 40.

Figure 2:
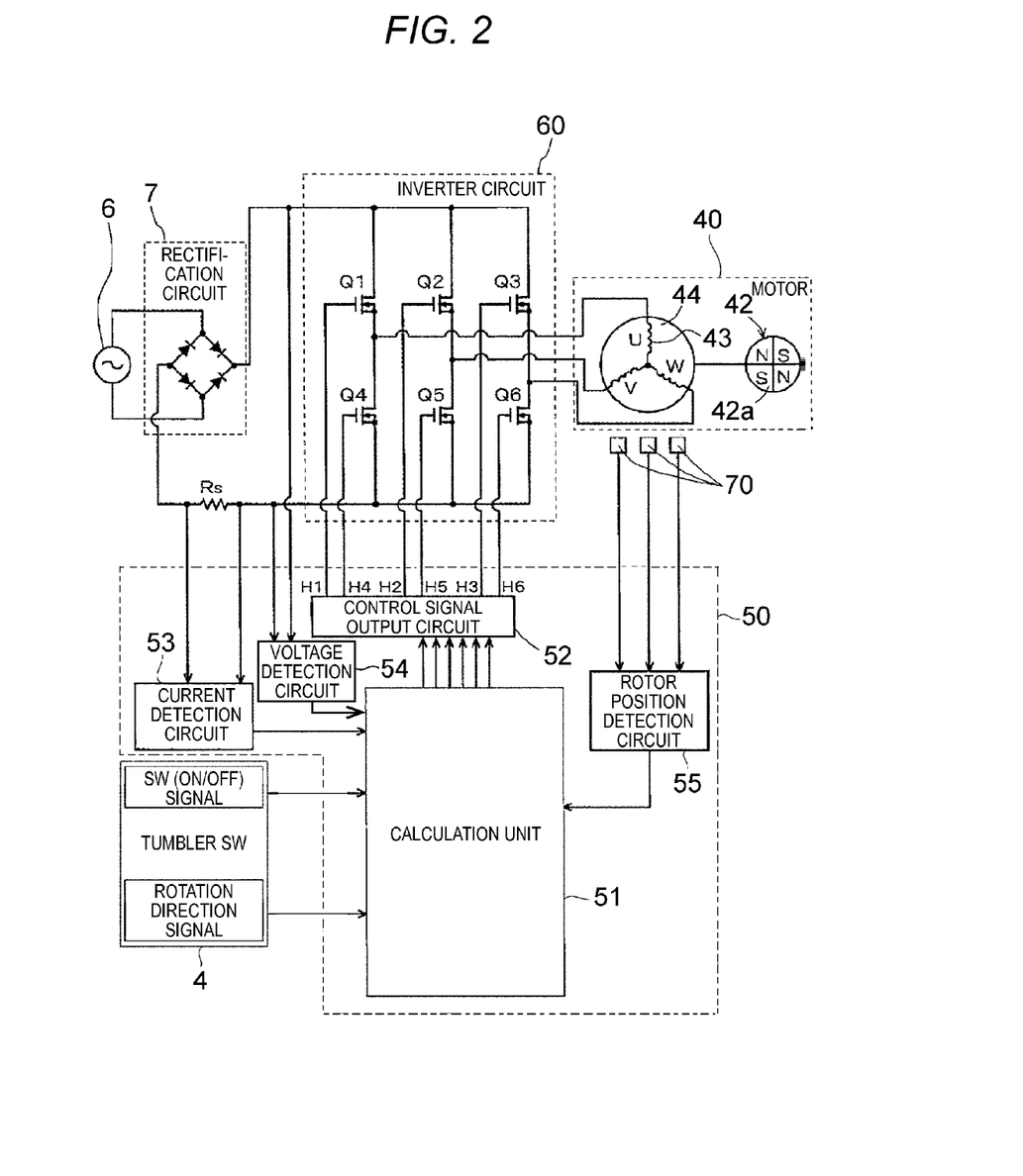
FIG. 2 is a control block diagram of the impact wrench of the illustrative embodiment.

FIG. 2 is a control block diagram of the impact wrench. The brushless motor 40 is configured by a three-phase brushless DC motor. The rotor 42 has a permanent magnet 42a including a plurality of sets (two sets, in this illustrative embodiment) of N-poles and S-poles. The stator 44 has star-connected three-phase stator windings 43 (U, V, W). The control unit has the control circuit 50 and the inverter circuit 60. A rectification output of the rectification circuit 7 is supplied to the stator windings U, V, W of the brushless motor 40 through the inverter circuit 60.

The inverter circuit 60 is mounted on the inverter circuit board 61 arranged at the rear of the brushless motor 40 in FIG. 1. The inverter circuit 60 has six switching elements Q1 to Q6 such as FETs, which are connected in a three-phase bridge form.

In order to detect a rotation position of the rotor 42, rotor position detection element (Hall elements and the like) 70 are arranged on the inverter circuit board 61 every a predetermined interval, for example, 60° in a circumferential direction of the rotor 42. The energization direction and time for the stator windings U, V, W are controlled by the control circuit 50, and the brushless motor 40 is rotated on the basis of position detection signals from the rotor position detection elements 70.

The control circuit 50 has a calculation unit 51 (a microcomputer), a control signal output circuit 52, a current detection circuit 53, a voltage detection circuit 54 and a rotor position detection circuit 55. Although not shown, the calculation unit 51 includes a central processing unit (CPU) for outputting a driving signal of the inverter circuit 60 based on a processing program and data, a ROM for storing a processing program and control data, a RAM for temporarily storing data and a timer. The control signal output circuit 52 outputs a control signal to each gate of the six switching elements Q1 to Q6 to which the inverter circuit 60 is bridge-connected. The current detection circuit 53 detects a supplied current, based on a voltage drop of a resistance Rs inserted on a current supply path from the rectification circuit 7 to the inverter circuit 60, and outputs the detected current to the calculation unit 51. The voltage detection circuit 54 detects a supplied voltage to the inverter circuit 60 and outputs the same to the calculation unit 51. The rotor position detection circuit 55 receives outputs of the respective rotor position detection elements 70 and outputs position detection signals of the rotor 42 to the calculation unit 51.

The calculation unit 51 generates a driving signal for alternately switching the predetermined switching elements Q1 to Q6, based on the position detection signal of the rotor position detection circuit 55, and outputs the generated driving signal to the control signal output circuit 52. Thereby, the predetermined windings of the stator windings U, V, W are alternately energized to rotate the rotor 42 in a set rotation direction. The detected values of the current detection circuit 53 and the voltage detection circuit 54 are fed back to the calculation unit 51, so that the set motor driving power is made.

Figure 3:
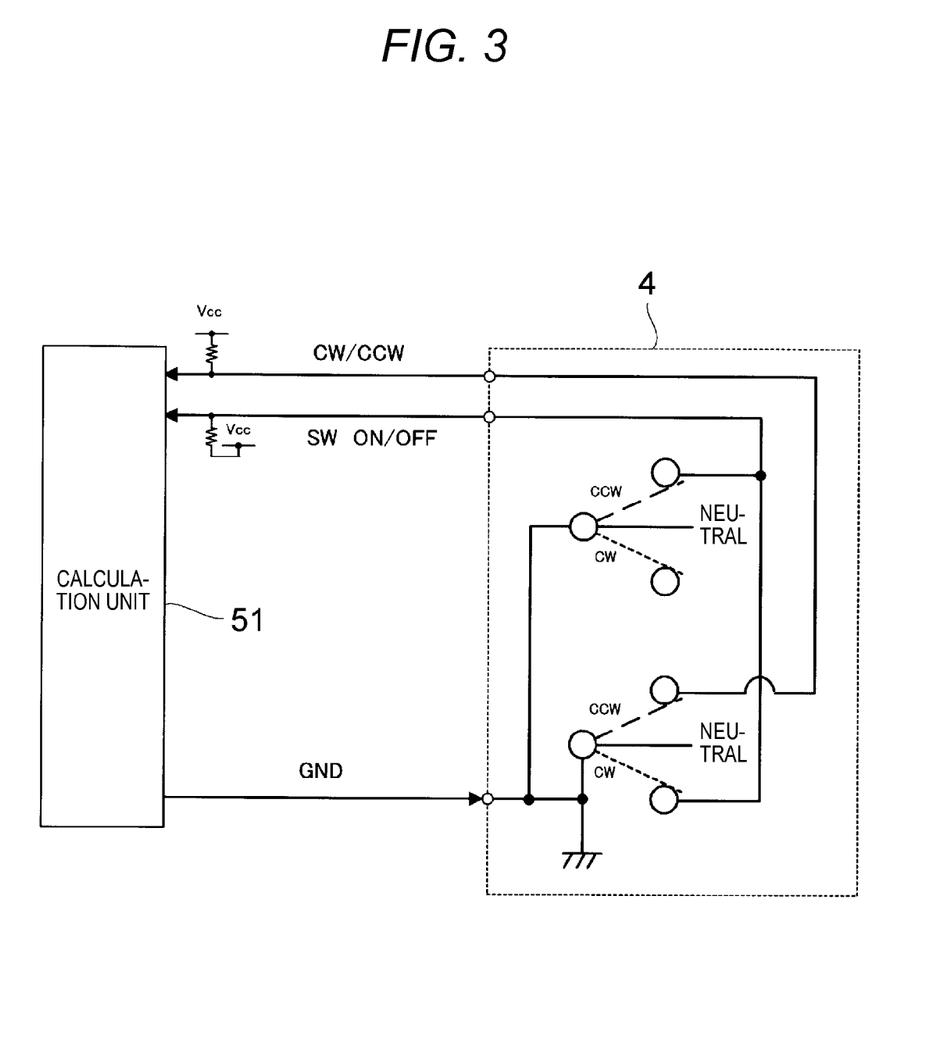
FIG. 3 is a circuit diagram showing a connection relation between a tumbler switch and a calculation unit of the illustrative embodiment.

The tumbler switch 4 is connected to the calculation unit 51, as shown in FIG. 3, and functions as an electronic switch. That is, at a neutral position of the tumbler switch 4 shown in FIG. 3, both a rotation direction signal indicating forward rotation/reverse rotation (CW/CCW) and a SW signal indicating switch ON/OFF states (SW ON/OFF) are high levels (Vcc). In this case, the SW signal of a high level becomes a stop signal, and the tumbler switch 4 outputs an instruction for stop of the motor to the calculation unit 51.

When the tumbler switch 4 is operated in a first direction (the CW-side), the SW signal indicating the switch on/off (SW ON/OFF) becomes a low level (a GND level), an instruction for startup of the motor is output to the calculation unit 51, the rotation direction signal indicating the forward rotation/reverse rotation (CW/CCW) becomes a high level (Vcc). In this case, the tumbler switch 4 outputs an instruction for forward rotation of the motor to the calculation unit 51.

When the tumbler switch 4 is operated in a second direction (the CCW-side), the SW signal indicating the switch on/off (SW ON/OFF) becomes a low level (a GND level), an instruction for startup of the motor is output to the calculation unit 51, the forward rotation/reverse rotation (CW/CCW) signal also becomes a low level (a GND level) to thus be a reverse rotation signal. In this case, the tumbler switch 4 outputs an instruction for reverse rotation of the motor to the calculation unit 51.

Each gate of the six switching elements Q1 to Q6, to which the inverter circuit 60 is bridge-connected, is connected to the control signal output circuit 52, and each drain or source of the six switching elements Q1 to Q6 is connected to the star-connected stator windings U, V, W. The six switching elements Q1 to Q6 perform a switching operation, based on the switching element driving signals (driving signals H1 to H6) input from the control signal output circuit 52, and feed power to the stator windings U, V, W by using the rectification output of the rectification circuit 7 applied to the inverter circuit 60 as a three-phase (U phase, V phase and W phase) voltage.

The respective gates of the negative power supply-side switching elements Q4, Q5, Q6 of the six switching elements Q1 to Q6 are supplied with pulse width modulation signals (PWM signals) H4, H5, H6, and pulse widths (duty ratios) of the PWM signals are changed by the calculation unit 51, depending on a tumbler switch operation (1) or (2) of FIG. 4 or 6 (which will be described later), so that a power feed amount to the brushless motor 40 is adjusted to control the startup/stop, the rotating speed and the like in the forward or reverse rotation direction of the brushless motor 40. That is, upon the startup of the motor, the pulse widths of the pulse width modulation signals H4, H5, H6 are gradually increased to enable the startup in a soft start manner. Also, the startup of a slow soft start manner in which the pulse width is increased more slowly than the soft start manner is enabled.

Incidentally, the PWM signals may be supplied to the positive power supply-side switching elements Q1 to Q3 (high-side switches), alternative to the negative power supply-side switching elements Q4 to Q6 (low-side switches).

As shown in FIG. 1, an LED illuminator 80 is provided at a lower part of the trunk part 2 of the housing 1. The LED illuminator is on or off by a control panel 85 exposed on an upper surface-side of a lower part 3a of the handle part 3. Also, it is possible to select the motor driving power corresponding to a utility through the control panel 85.

Here, operations of the impact wrench will be described with reference to FIGS. 4 and 5 (the tumbler switch operation (1)).

Figure 4:
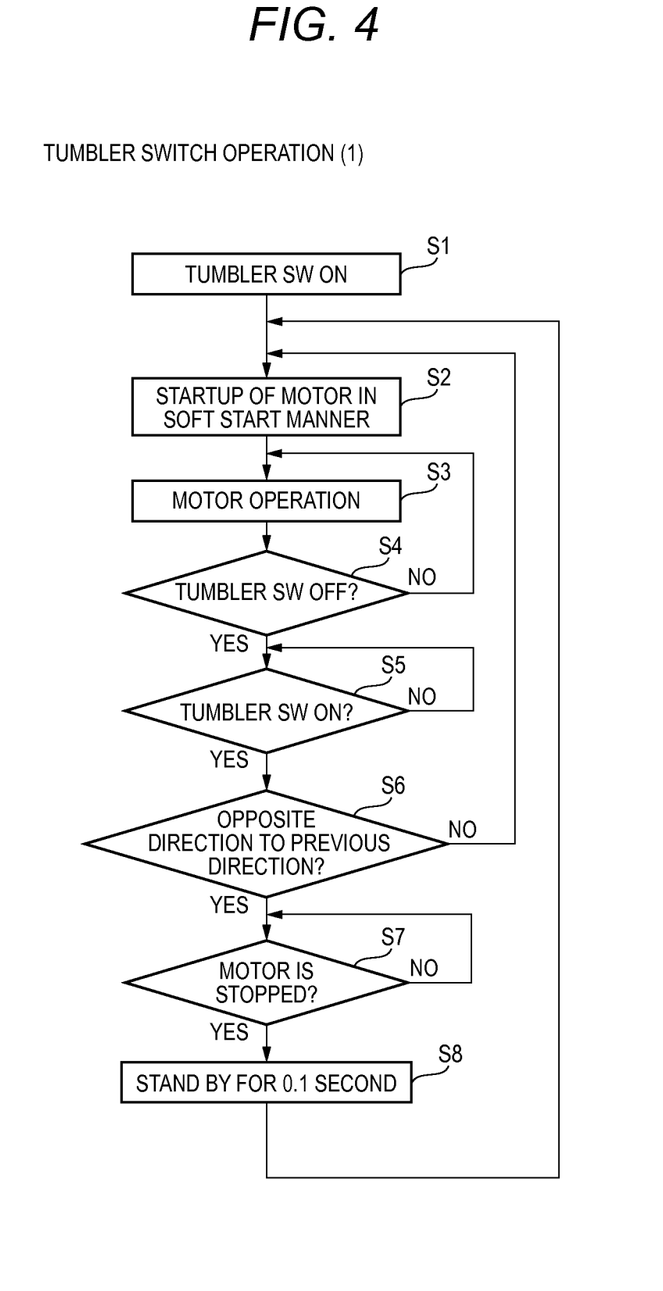
FIG. 4 is a flowchart showing a tumbler switch operation (1) of the illustrative embodiment.
Figure 5:
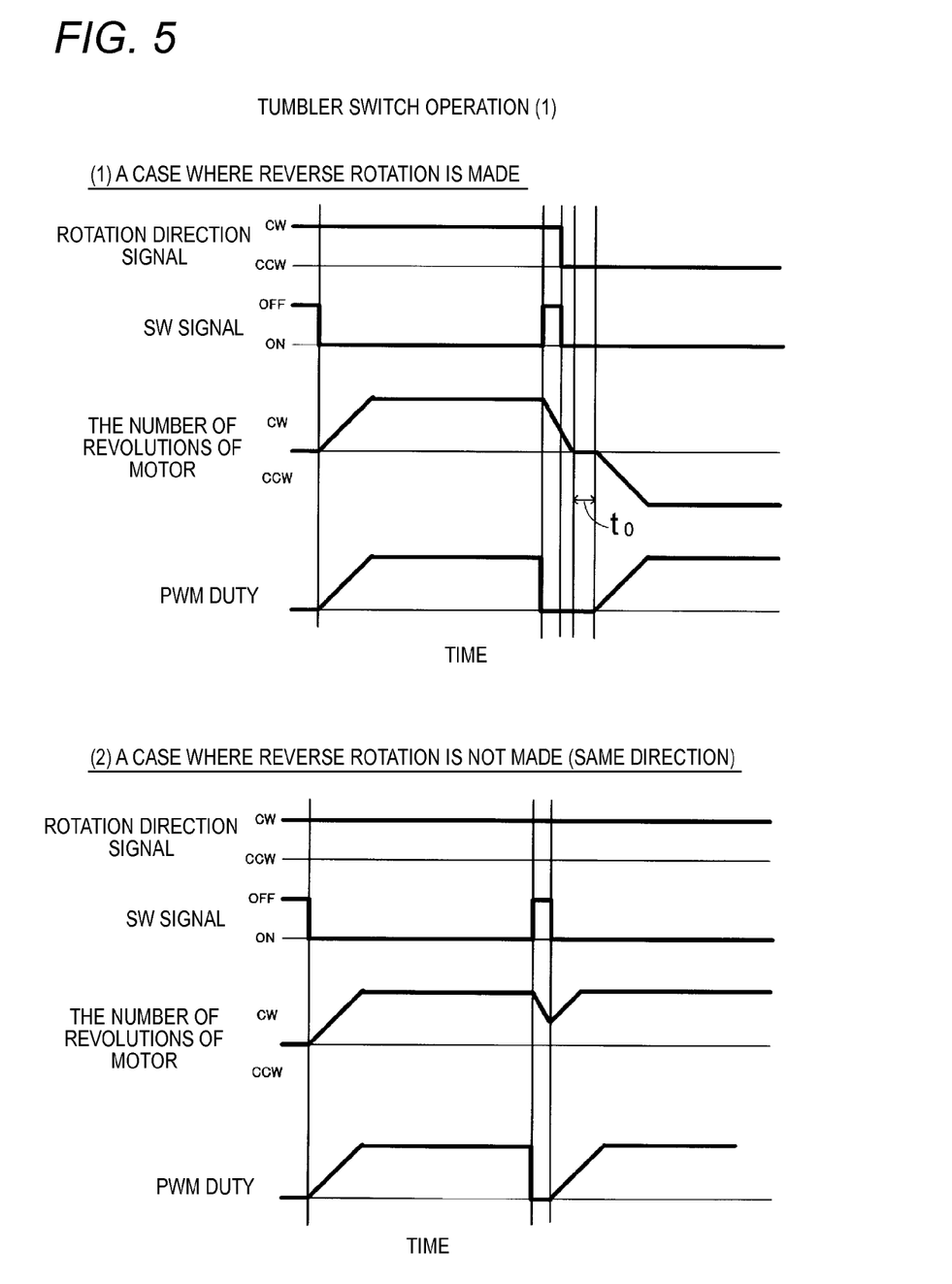

In step S1 of FIG. 4, the tumbler switch 4 becomes on in one direction and an instruction for startup of the motor in a predetermined direction (forward rotation or reverse rotation) is output to the calculation unit 51. In step S2, the brushless motor 40 is enabled to startup in the soft start manner. That is, the pulse width of the pulse width modulation signal to the inverter circuit 60 is gradually increased to gradually increase an effective supply voltage to the brushless motor 40. In step S3, the brushless motor 40 is normally operated in the predetermined direction. Thereafter, in step S4, the tumbler switch 4 is returned to the neutral position and becomes off (YES in step S4), so that an instruction for stop of the motor is output to the calculation unit 51.

Then, in step S5, when the tumbler switch 4 again becomes on (YES in step S5), the calculation unit 51 determines in step S6 whether the rotation direction instructed by the tumbler switch 4 is an opposite direction to a previous rotation direction. When the rotation direction is an opposite direction to the previous rotation direction (YES in step S6), the calculation unit 51 determines in step S7 whether the motor is stopped. When the brushless motor 40 is stopped (YES in step S7), the calculation unit further stands by for predetermined time of about 0.1 second in step S8 and then proceeds to the soft start of step S2.

The upper part of FIG. 5 shows a timing chart when the motor is reversed from the previous rotation direction, as described above. Even when the SW signal indicating the switch on/off (SW ON/OFF) becomes on as soon as the rotation direction signal indicating the forward rotation/reverse rotation (CW/CCW) is switched, the motor is not immediately energized. That is, even after the number of rotations of the motor becomes zero, the motor stands by for predetermined time t0 and then gradually increases the PWM duty to start up in the soft start manner. This is because the over-current may flow if a voltage of a reverse direction is applied to the brushless motor 40 before the number of rotations of the motor becomes completely zero.

In step S6 of FIG. 4, when the calculation unit 51 determines that the rotation direction instructed by the tumbler switch 4 is the same direction as the previous rotation direction (NO in step S6), the brushless motor 40 is enabled to startup in the soft start manner in step S2.

The lower part of FIG. 5 shows a timing chart for the above case. When the SW signal becomes on, the motor gradually increases the PWM duty to start up in the soft start manner without standing by until the number of rotations of the motor becomes zero.

Incidentally, step S8 of FIG. 4 may be omitted to make the standby time zero, depending on an operating condition of the brushless motor 40.

Another operation of the impact wrench will be described with reference to FIGS. 6 and 7 (the tumbler switch operation (2)).

Figure 6:
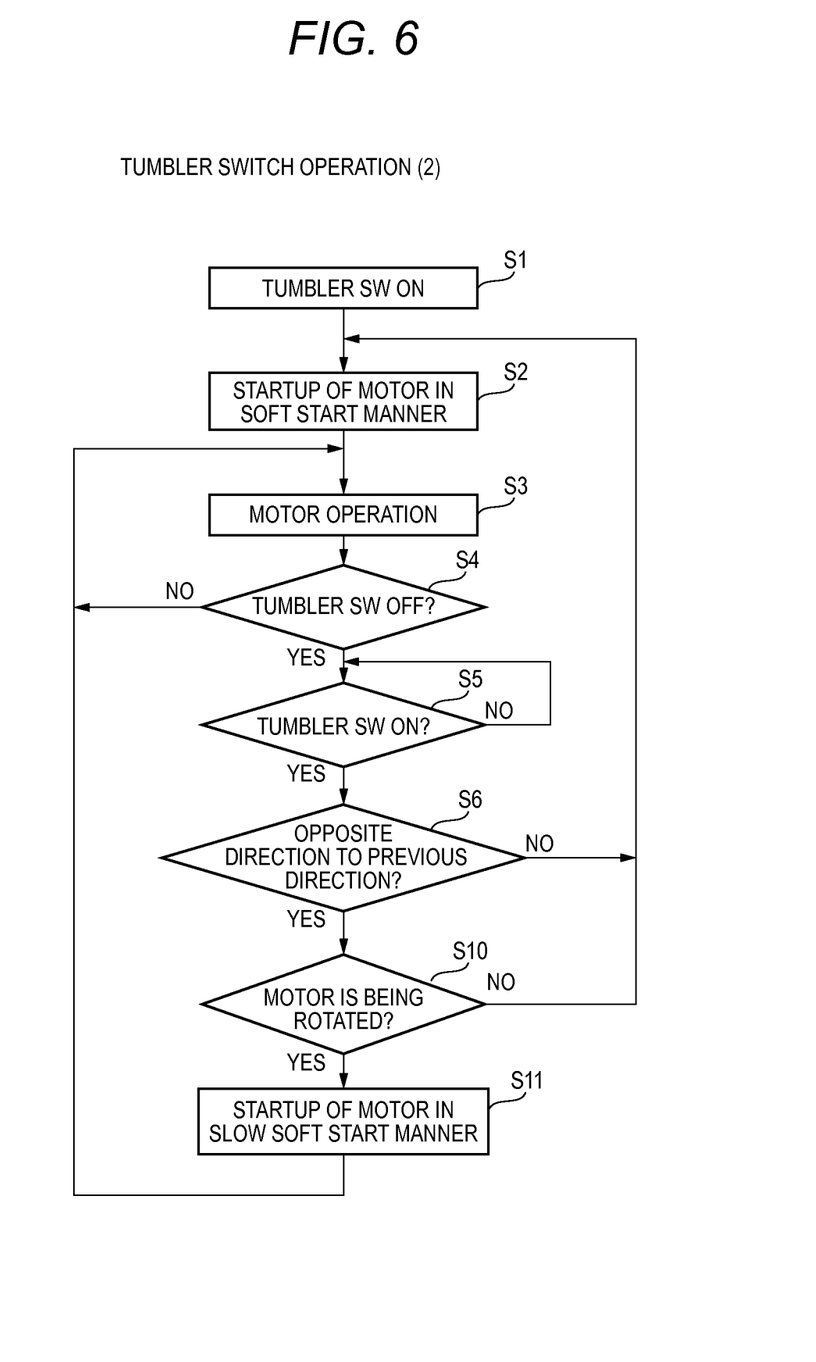
FIG. 6 is a flowchart showing a tumbler switch operation (2) of the illustrative embodiment.
Figure 7:
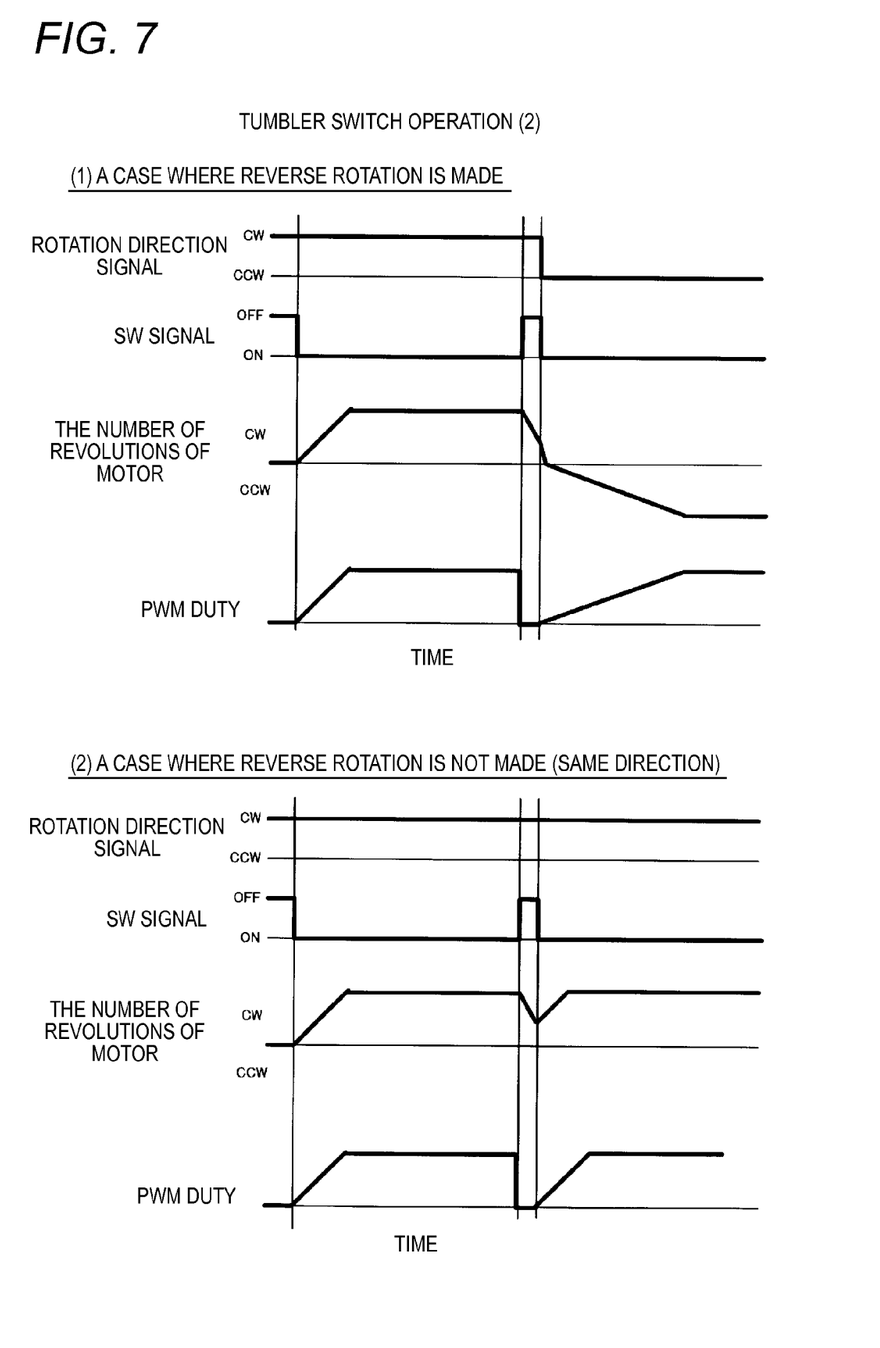

Steps S1 to S6 of FIG. 6 are the same as FIG. 4. When it is determined in step S6 that the rotation direction instructed by the tumbler switch 4 is an opposite direction to the previous rotation direction (YES in step S6), the calculation unit 51 determines in step S10 whether the motor is being rotated. When it is determined that the motor is not being rotated (NO in step S10), the processing returns to step S2 and the startup of the usual soft start manner is performed. When it is determined that the motor is being rotated (YES in step S10), a startup of the slow soft start manner in which the PWM duty is increased more slowly than the startup of the usual soft start manner is performed. Thereby, it is possible to suppress the over-current that is caused when a voltage of a reverse direction is applied to the brushless motor 40 before the number of rotations of the motor becomes completely zero.

The upper part of FIG. 7 shows a timing chart when the motor is reversed from the previous rotation direction, as described above. When the motor is being rotated at a point of time at which the SW signal becomes on as soon as the rotation direction signal is switched, a startup of the slow soft start manner in which the PWM duty is increased more slowly than the startup of the usual soft start manner is performed.

In step S6, when it is determined that the rotation direction instructed by the tumbler switch 4 is the same direction as the previous rotation direction, the startup of the usual soft start manner is performed at a point of time at which the SW signal becomes on.

The lower part of FIG. 7 shows a timing chart for the above case. When the SW signal becomes on, the motor gradually increases the PWM duty to start up in the soft start manner without standing by until the number of rotations of the motor becomes zero.

According to this illustrative embodiment, following effects can be obtained.

(1) The commutator is not required and the high-efficiency brushless motor 40 is adopted as a driving source. Thereby, in this illustrative embodiment, it is possible to shorten an overall length of a product to about 230 mm or shorter, compared to the 16 mm impact wrench product of the related art having an overall length of about 260 mm where a universal motor of an alternating current driving type is adopted as a driving source. Also, since the weight can be made to be light even though the motor output is the same, it is possible to perform a longtime operation and to realize the favorable workability and operability.

(2) The tumbler switch 4 is used as an electronic switch for control of the brushless motor 40. Thereby, it is possible to keep the favorable operability by the tumbler switch 4, like the related art. Also, since the tumbler switch 4 does not directly turn on/off the motor current (the tumbler switch 4 is not positioned on the current path), there is no melted contact point and the current capacity may be small, so that it is possible to use a low-priced tumbler switch.

(3) In FIG. 4 (the tumbler switch operation (1)), when the rotation direction signal reversing the brushless motor 40 is applied to the control circuit 50 through the operation of the tumbler switch 4, the brushless motor 40 is enabled to start up in the soft start manner after the brushless motor 40 is stopped. Therefore, it is possible to prevent the over-current from flowing to the brushless motor 40.

(4) In FIG. 6 (the tumbler switch operation (2)), when the rotation direction signal reversing the brushless motor 40 is applied to the control circuit 50 through the operation of the tumbler switch 4, the brushless motor 40 is enabled to start up in the slow soft start manner slower than the soft start manner if the brushless motor 40 is being rotated. Therefore, it is possible to prevent the over-current from flowing to the brushless motor 40.

Although the present invention has been described with reference to the illustrative embodiment, it can be understood by one skilled in the art that the respective components and respective processes of the illustrative embodiment can be variously modified within the scope defined in the claims.

In the above illustrative embodiment, the impact wrench has been exemplified as the electric tool. However, the present invention is not limited to the impact wrench inasmuch as an electric tool has a brushless motor mounted thereon and switches on/off and forward rotation/reverse rotation by a tumbler switch. For example, an impact driver, an electric driver drill, a hammer drill and the like are also possible. Also, the driving source of the brushless motor may be a battery pack detachably mounted to a housing, rather than the commercial alternating current power supply. In this case, in FIG. 2, a battery pack may be connected instead of the commercial alternating current power supply 6 and the rectification circuit 7 may be omitted. Also, if the brushless motor may be braked upon release of the tumbler switch (i.e., the tumbler switch is located at the neutral position), when the tumbler switch is operated from one direction into an opposite direction thereto, it is possible to shorten a time period that is consumed until the motor is rotated in the opposite direction.

Thus, as has been described heretofore, the following matters are disclosed in this specification.

In the electric tool, when a signal for rotating the brushless motor in an opposite direction to a previous rotation direction is applied to the control unit through an operation of the switch, the control unit may be configured to start up the brushless motor in a soft start manner after the brushless motor is stopped.

In the electric tool, when a signal for rotating the brushless motor in an opposite direction to a previous rotation direction is applied to the control unit through an operation of the switch, the control unit may be configured to start up the brushless motor in a slow soft start manner that is slower than a soft start manner if the brushless motor is being rotated.

In the electric tool, the switch may be configured by a tumbler switch.

In the electric tool, the switch may be configured to apply a rotation direction signal of the brushless motor to the control unit.

This application claims the benefit of Japanese Patent Application No. 2013-202837 filed on Sep. 28, 2013, the disclosure of which is incorporated herein in its entirety by reference.

INDUSTRIAL APPLICABILITY

As described above, the electric tool according to the present invention has advantages of shortening an overall lengths and lightening a weight of the electric tool by adopting a brushless motor, which does not require a commutator, as a driving source and by using a tumbler switch for switching control. The present invention is useful for the electric tool, for example.

REFERENCE SIGNS LIST

1: housing
2: trunk part
3: handle part
4: tumbler switch
5: power supply cord
7: rectification circuit
8: power supply circuit board
9: control circuit board
20: striking mechanism part
30: output part
40: brushless motor
50: control circuit
51: calculation unit
60: inverter circuit
61: inverter circuit board
70: rotor position detection element
80: LED illuminator
85: control panel

The invention claimed is:

1. An electric tool comprising:
a brushless motor, to which power is fed from a power supply;
an output part, which is driven by the brushless motor, and to which a tip tool is mounted;
a control unit configured to control a rotation direction and a rotating speed of the brushless motor; and
a tumbler switch connected to the control unit and configured to be operable at a neutral position, in a first direction or in a second direction,
wherein the tumbler switch is configured to:
output a stop instruction to the control unit to stop the brushless motor in a case where the switch is at a neutral position;
output a forward rotation instruction to the control unit to start up the brushless motor and forward rotate the brushless motor in a case where the switch is operated in a first direction; and
output a reverse rotation instruction to the control unit to start up the brushless motor and reversely rotate the brushless motor in a case where the switch is operated in a second direction,
wherein the switch is provided outside a current path between the power supply and the brushless motor.

2. The electric tool according to claim 1, wherein when an instruction for rotating the brushless motor in an opposite direction to a previous rotation direction is applied to the control unit through an operation of the tumbler switch, the control unit is configured to start up the brushless motor in a soft start manner after the brushless motor is stopped.

3. The electric tool according to claim 1, wherein when an instruction for rotating the brushless motor in an opposite direction to a previous rotation direction is applied to the control unit through an operation of the tumbler switch, the control unit is configured to start up the brushless motor in a slow soft start manner that is slower than a soft start manner if the brushless motor is being rotated.

4. The electric tool according to claim 1, wherein the tumbler switch comprises a pair of switches and a pair of signal lines connected to the control unit,
wherein the pair of switches are operable at the neutral position, in the first direction or in the second direction through an operation of the tumbler switch, and
wherein the pair of signal lines is configured to apply a rotation direction signal indicating forward rotation/reverse rotation and a SW signal indicating switch ON/OFF states to the control unit.

* * * * *